(12) United States Patent
Coss et al.

(10) Patent No.: US 7,143,438 B1
(45) Date of Patent: Nov. 28, 2006

(54) METHODS AND APPARATUS FOR A COMPUTER NETWORK FIREWALL WITH MULTIPLE DOMAIN SUPPORT

(75) Inventors: Michael John Coss, Bridgewater, NJ (US); David L. Majette, Bernardsville, NJ (US); Ronald L. Sharp, Califon, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 437 days.

(21) Appl. No.: 08/927,382

(22) Filed: Sep. 12, 1997

(51) Int. Cl.
*G06F 15/16* (2006.01)
*G06F 11/30* (2006.01)
*H04L 9/00* (2006.01)

(52) U.S. Cl. .............................. 726/11; 709/224; 726/1
(58) Field of Classification Search ................ 713/201, 713/200, 150–154, 160, 161; 709/223–229, 709/245, 246, 200; 395/187.01; 380/25
See application file for complete search history.

(56) References Cited

U.S. PATENT DOCUMENTS

| | | | | |
|---|---|---|---|---|
| 5,550,984 | A * | 8/1996 | Gelb ...................... | 395/200.17 |
| 5,606,668 | A * | 2/1997 | Shwed .................... | 395/200.1 |
| 5,623,601 | A * | 4/1997 | Vu ......................... | 395/187.01 |
| 5,826,014 | A * | 10/1998 | Coley et al. ............ | 395/187.01 |
| 5,835,726 | A * | 11/1998 | Shwed et al. ............... | 709/229 |
| 5,842,040 | A * | 11/1998 | Hughes et al. ................ | 710/11 |
| 5,848,233 | A | 12/1998 | Radia et al. | |
| 5,898,830 | A * | 4/1999 | Wesinger, Jr. et al. .. | 395/187.01 |
| 6,098,172 | A * | 8/2000 | Coss et al. .................. | 713/201 |
| 6,154,775 | A * | 11/2000 | Coss et al. .................. | 709/225 |
| 6,170,012 | B1 * | 1/2001 | Coss et al. .................. | 709/229 |

FOREIGN PATENT DOCUMENTS

| | | |
|---|---|---|
| EP | 0 743 777 A2 | 11/1996 |
| EP | 0 856 974 A2 | 8/1998 |
| WO | WO 97/00471 | 1/1997 |
| WO | WO 97/02734 | 1/1997 |
| WO | WO 97/49038 | 12/1997 |

OTHER PUBLICATIONS

Press Release, "EliaShim Ltd. Announces CVP-Compliant Anti-Virus Plug-In for Check Point FireWall-1," pp. 1-2, Feb. 17, 1997.
Check Point FireWall-1™, OPSEC Open Specification, Version 1.01, Check Point Software Technologies Ltd., pp. 1-72, Nov. 1998.
E. Amoroso et al., "PCWEEK Intranet and Internet Firewall Strategies," Ziff-Davis Press, 1996.

* cited by examiner

*Primary Examiner*—Christopher Revak

(57) ABSTRACT

The invention provides improved computer network firewalls which include one or more features for increased processing efficiency. A firewall in accordance with the invention can support multiple security policies, multiple users or both, by applying any one of several distinct sets of access rules. The firewall can also be configured to utilize "stateful" packet filtering which involves caching rule processing results for one or more packets, and then utilizing the cached results to bypass rule processing for subsequent similar packets. To facilitate passage to a user, by a firewall, of a separate later transmission which is properly in response to an original transmission, a dependency mask can be set based on session data items such as source host address, destination host address, and type of service. The mask can be used to query a cache of active sessions being processed by the firewall, such that a rule can be selected based on the number of sessions that satisfy the query. Dynamic rules may be used in addition to pre-loaded access rules in order to simplify rule processing. To unburden the firewall of application proxies, the firewall can be enabled to redirect a network session to a separate server for processing.

26 Claims, 12 Drawing Sheets

| RULE NO. | SOURCE HOST | DEST. HOST | SERVICE | ACTION |
|---|---|---|---|---|
| 10 | A | B | FTP | PASS |
| 20 | A | * | * | DROP |
| 30 | B | C | TELNET | PROXY |
| 40 | * | D | MAIL | PASS |

FIG. 3

| SESSION KEY | HARDWARE ADDRESS | INTERFACE | RULE NO. | ALARM CODE | STAT. INFO. | ACTION |
|---|---|---|---|---|---|---|
| A, B, TELNET | Ma, Mb | en0, en1 | 10 | 10 | 5 PKTS. | PASS |
| B, A, TELNET | Mb, Ma | en1, en0 | 10 | 10 | 5 PKTS. | PASS |
| C, A, MAIL | Mc, Ma | en1, en0 | 30 | 20 | 100 PKTS. | PASS |
| A, C, MAIL | Ma, Mc | en0, en1 | 30 | 20 | 10 PKTS. | PASS |
| D, A, TELNET | Md, Ma | en1, en0 | 40 | 30 | 15 PKTS. | DROP |
| E, A, MAIL | Me, Ma | en1, en0 | 30 | 10 | 30 PKTS. | PASS |
| A, E, MAIL | Ma, Me | en0, en1 | 30 | 10 | 10 PKTS. | PASS |

FIG. 4

| INTERFACE | ADDRESS RANGE | DOMAIN |
|---|---|---|
| 0 | 10.50.0.0 - 10.50.255.255 | A |
| 0 | 10.60.0.0 - 10.60.255.255 | B |
| 1 | * | C |
| 2 | * | * |

FIG. 6

| NAME | SOURCE HOST | DEST. HOST | SERVICE | ACTION | HIT COUNT |
|---|---|---|---|---|---|
| TRACEROUTE | * | * | TRACEROUTE | PASS | 1 |
| PPTP | * | * | TCP/1723 | PASS | 1 |
| TELNET | A | B | TELNET | DROP | 10 |
| REALAUDIO | * | * | TCP/7070 | PASS | 1 |

FIG. 8

METHODS AND APPARATUS FOR A COMPUTER NETWORK FIREWALL WITH MULTIPLE DOMAIN SUPPORT

FIELD OF THE INVENTION

This invention relates to the prevention of unauthorized access in computer networks and, more particularly, to firewall protection within computer networks.

BACKGROUND OF THE INVENTION

In computer networks, information is conventionally transmitted in the form of packets. Information present at one site may be accessed by or transmitted to another site at the command of the former or the latter. Thus, e.g., if information is proprietary, there is a need for safeguards against unauthorized access. To this end, techniques known as packet filtering, effected at a network processor component known as a firewall, have been developed and commercialized. At the firewall, packets are inspected and filtered, i.e., passed on or dropped depending on whether they conform to a set of predefined access rules. Conventionally, these rule sets are represented in tabular form.

Typically, a firewall administrator allows broad access which is consented to from one side of the firewall to the other, but blocks transmissions in the opposite direction which are not part of an active network session. For example, "inside" company employees may have unrestricted access through the firewall to an "outside" network such as the Internet, but access from the Internet is blocked unless it has been specifically authorized. In addition to such a firewall at a corporate boundary to the Internet, firewalls can be interposed between network domains, and can also be used within a domain to protect sub-domains. In each case, different security policies may be involved.

In certain complex network protocols, separate, additional network sessions are required from the outside back to the user. One such complex protocol is employed by a service known by the trade name "RealAudio." Without special measures, the request for the separate session will be blocked by the firewall.

For such complex protocols, separate "proxy" processes have been developed to run concurrently on the firewall processor on behalf of the user. Proxy processes have also been developed for other special-purpose applications, e.g., to perform services such as authentication, mail handling, and virus scanning.

In the interest of maximizing the number of sessions which can run concurrently, since the capacity of a firewall processor to support concurrent processes is limited, it is desirable to minimize the need for proxy processes on the firewall. Such minimization is desirable further in the interest of over-all transmission rate, as passage of incoming data through separate processes tends to slow transmission down.

SUMMARY OF THE INVENTION

The present invention provides techniques for implementing computer network firewalls so as to improve processing efficiency, improve security, increase access rule flexibility, and enhance the ability of a firewall to deal with complex protocols. In accordance with a first aspect of the invention, a computer network firewall is able to support (a) multiple security policies, (b) multiple users, or (c) multiple security policies as well as multiple users, by applying any one of several distinct sets of access rules for a given packet. The particular rule set that is applied for any packet can be determined based on information such as the incoming and outgoing network interfaces as well as the network source and destination addresses.

In accordance with a second aspect of the invention, a computer network firewall can be configured to utilize "stateful" packet filtering which improves performance by storing the results of rule processing applied to one or more packets. Stateful packet filtering may be implemented by caching rule processing results for one or more packets, and then utilizing the cached results to bypass rule processing for subsequent similar packets. For example, the results of applying a rule set to a particular packet of a network session may be cached, such that when a subsequent packet from the same network session arrives in the firewall, the cached results from the previous packet are used for the subsequent packet. This avoids the need to apply the rule set to each incoming packet.

In accordance with a third aspect of the invention, a computer network firewall authorizes or prevents certain network sessions using a dependency mask which can be set based on session data items such as source host address, destination host address, and type of service. The dependency mask can be used to query a cache of active sessions being processed by the firewall, to thereby identify the number of sessions that satisfy the query. The query may be associated with an access rule, such that the selection of that particular rule is dependent on the number of successful matches to the query.

In accordance with a fourth aspect of the invention, a computer network firewall may make use of dynamic rules which are added to a set of access rules for processing packets. The dynamic rules allow a given rule set to be modified based on events happening in the network without requiring that the entire rule set be reloaded. Exemplary dynamic rules include a "one-time" rule which is only used for a single session, a time-limited rule which is used only for a specified time period, and a threshold rule which is used only when certain conditions are satisfied. Other types of dynamic rules include rules which define a host group, such that the host group can be modified to add or drop different hosts without altering other aspects of the access rule set.

In accordance with a fifth aspect of the invention, a computer network firewall can be instructed to redirect a network session to a separate server for processing, so as to unburden the firewall of application proxies. The separate server processes the redirected network session, and then passes the session back through the firewall to the intended original destination.

The computer network firewalls of the present invention facilitate firewall processing in a wide variety of important applications. For example, the invention may be implemented in a dial-up access gateway. Another exemplary embodiment of the invention may be implemented in a distributed manner with a first portion of the firewall resident in the network and a second portion of the firewall resident in a set-top box, computer or other user terminal in a home or business. The latter embodiment can allow the firewall techniques of the invention to provide, for example, parental control of Internet and video access in the home. These and other features and advantages of the present invention will become more apparent from the accompanying drawings and the following detailed description.

BRIEF DESCRIPTION OF THE DRAWINGS

FIG. 3 is a schematic which illustrates a rule table.

FIG. 4 is a schematic which illustrates a cache.

FIG. 6 is a schematic which illustrates a domain table.

FIG. 8 is a schematic which illustrates a dependency mask.

DETAILED DESCRIPTION

The preferred techniques can be implemented at a firewall for controlling the flow of data between, for example, separate local area networks (LANs) or subnets of a LAN. Exemplary embodiments of the invention are described herein in terms of processes. Efficient prototypes of such processes have been implemented as computer system software, using the "C" programming language for implementation on general-purpose PC hardware. Efficiency can be enhanced further, as is known, by special-purpose firmware or hardware computer system implementations.

1. Support for Multiple Security Domains

With a capability for supporting multiple security domains, a single firewall can support multiple users, each with a separate security policy. Also, as different security policies can apply for communications between sub-sites, such a capability can be used within a site. Respective configurations are illustrated by FIGS. 1 and 2.

Figure 1:
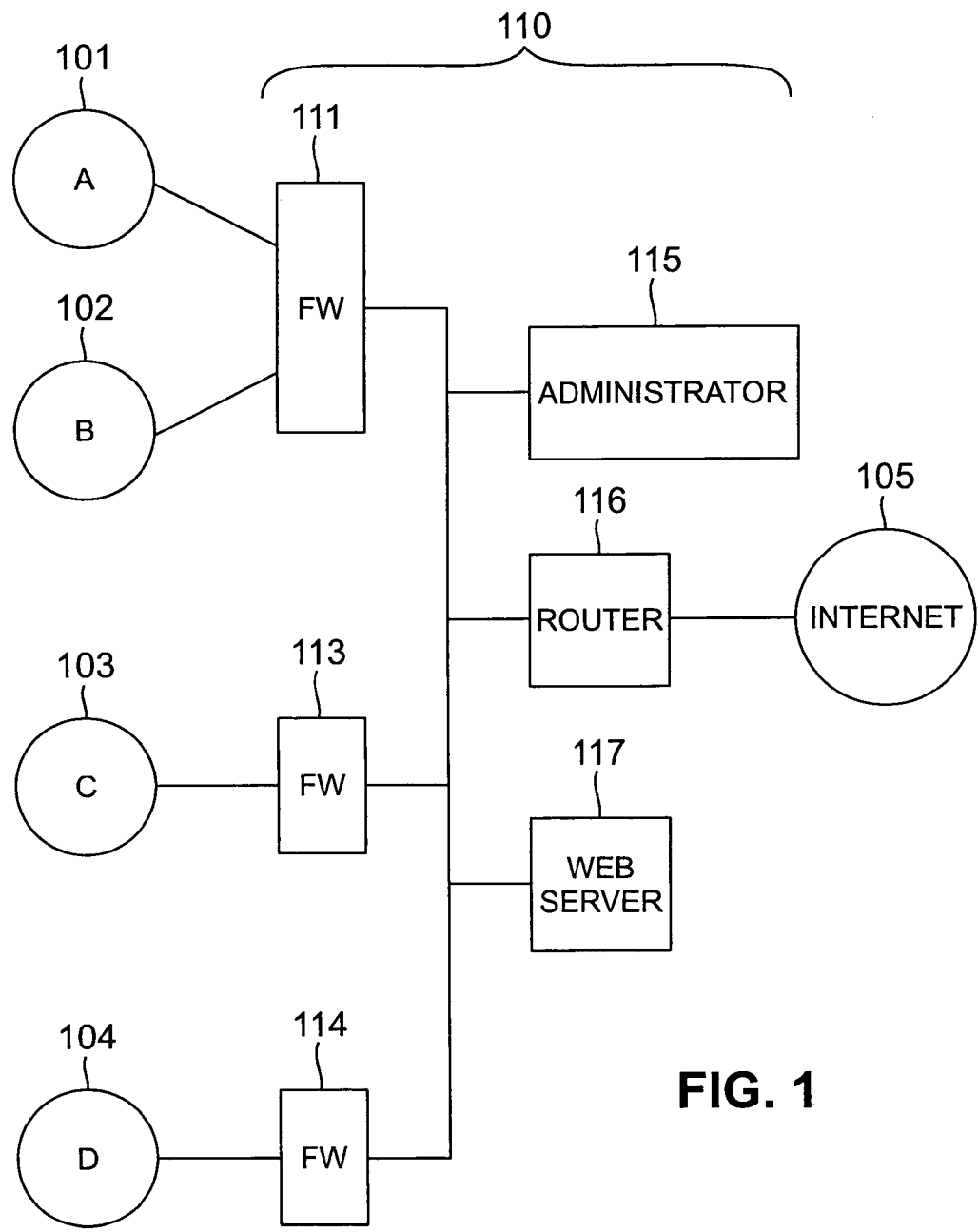
FIG. 1 is a schematic of several user sites or domains connected to the Internet via a local area network providing firewall protection to the user sites.

FIG. 1 shows four user sites 101–104, e.g., of corporations A through D, with firewall protection in their connections to the Internet 105. Such protection is provided by a firewall facility, here in the form of a LAN 110, including firewall processors 111, 113 and 114, an administrator processor 115, a router 116 and a web server 117. Each of firewall processors 113 and 114 is dedicated to a single site, namely respective sites 103 and 104. Firewall processor 111 is configured to serve the two sites 101 and 102. Firewall processor 111 implements separate firewall policies for each of the two sites vis-a-vis the Internet 105, as well as for communications between the two sites. A process for preferred operation of the firewall processor 111 is described below with reference to FIGS. 5A and 5B, including properly selecting among different firewall policies.

Figure 2:
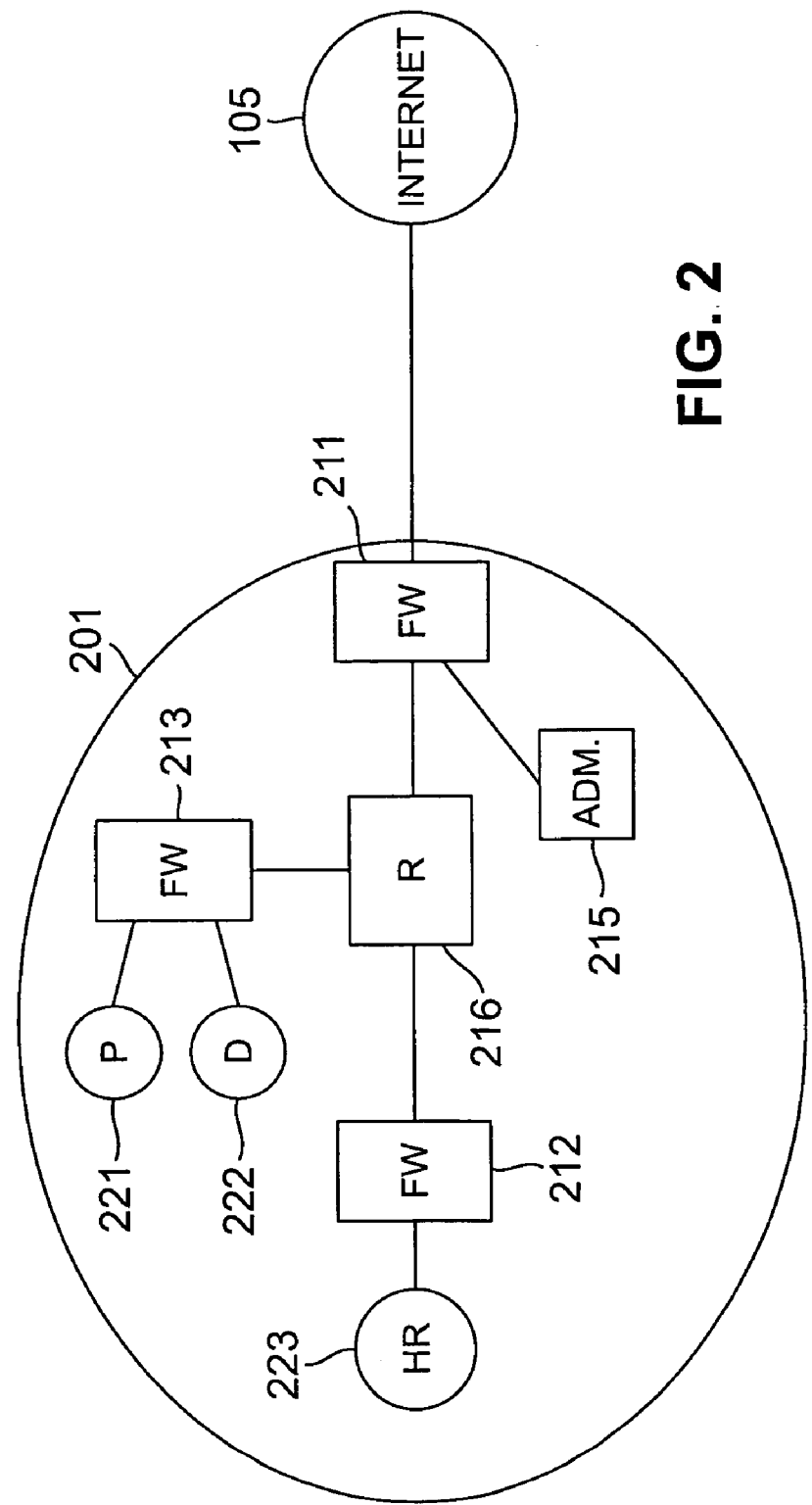
FIG. 2 is a schematic of a user site connected to the Internet and including internal firewalls.

FIG. 2 shows a user site 201 connected to the Internet 105 via a firewall processor 211. An administrator processor 215 and a router 216 are connected to the firewall processor 211. The router 216 is connected to additional firewall processors 212 and 213 which are internal to the user site 201. The firewall processor 212 protects a single sub-site 223, such as Human Resources (HR). The firewall processor 213 is configured for protecting two sub-sites, such as Payroll (P) and Disbursements (D), vis-a-vis the remainder of the site 201 as well as with respect to communications between sub-sites 221 and 222. This can be achieved by employing the process illustrated by FIGS. 5A and 5B in the firewall processor 213.

The security policies can be represented by sets of access rules which are represented in tabular form and which are loaded into the firewall by a firewall administrator. As illustrated in FIG. 3, such a table can provide for categories including rule number, designations of source and destination hosts, a designation of a special service which can be called for in a packet, and a specification of an action to be taken on a packet. Special services can include proxy services, network address translation, and encryption, for example. In FIG. 3, the categories "Source Host," "Destination Host" and "Service" impose conditions which must be satisfied by data included in a packet for the specified action to be taken on that packet. Other conditions can be included, and such conditions need not relate to data included in the packet. For example, application of a rule can be made conditional on the time of day or day of the week.

When a category provided for in the rule table is irrelevant in a certain rule, the corresponding table entry can be marked as a "wild card." This can apply to any one or any combination of the categories. In FIG. 3 and elsewhere, an asterisk (*) is used for wild card entries. "FTP" stands for "file transfer protocol."

In rule processing for a packet, the rules are applied sequentially until a rule is found which is satisfied by the packet (or until the rule table is exhausted, in which case the packet is dropped). For a packet to satisfy a rule, each condition included in the rule must be met. For example, with reference to FIG. 3, a packet from source host A to destination host D and representing mail will be dropped under Rule 20. The following is a more detailed list of exemplary rule set categories in accordance with the invention. The first five category names correspond to the categories shown in FIG. 3.

| Category Name | Description |
|---|---|
| Rule Number | Number of rule within domain. Rule numbers do not have to be unique but should generally represent a single service, such as FTP |
| Source Host | Source host group identifier or IP address |
| Destination Host | Destination host group identifier or IP address |
| Service | Service group or protocol/destination port/source port |
| Action | Rule action, e.g., "pass," "drop" or "proxy" |
| Notify on Drop | If "yes," an Internet Control Message Protocol (ICMP) message is sent out if action is "drop" |
| Cache Timeout | Number of seconds of inactivity before session entry is removed from cache |
| Reset Session | If "yes," for TCP sessions, send TCP reset to both ends of connection upon cache timeout |
| Rule Timeout | Number of seconds of inactivity before rule is removed from rule list |
| Start Period | Start active period for rule |
| End Period | End active period for rule |
| Kill Session at End of Period | If "yes" then any sessions authorized by this rule will be killed at the end of the time period |
| Dependency Mask | Dependency mask name |
| In Interface | Interface name to match on reception |
| Out Interface | Interface name to which packet is sent |
| Audit Session | Audit record generation. If "yes" then audit record is generated at the beginning and again at the end of the session. |

-continued

| Category Name | Description |
| --- | --- |
| Alarm Code | Alarm code value used to tie rule to particular alarms |
| Source Host Map Group | IP address or host group containing map-to host IP addresses |
| Source Host Map Type | Type of mapping to be performed, e.g., "pool" or "direct" |
| Destination Host Map Group | IP address or host group containing map-to host IP addresses |
| Destination Host Map Type | Type of mapping to be performed, e.g., "pool" or "direct" |
| Service Map Group | Service group containing map-to destination port numbers or the destination port. Protocol and source port in a referenced service group are ignored. |
| Service Map Type | Type of mapping to be performed, e.g., "pool" or "direct" |
| Max Use Total Count | Maximum number of times this rule may be used. The rule is removed after the limit is reached. |
| Max Use Concurrent Count | Maximum number of sessions authorized by this rule which may be active at a given time. The rule is inactive until the count falls below the designated value. |
| Copy to Address | Address of application to which a copy of packet is sent. Used for session captures. |
| Tunnel Destination | Set up a tunnel and send it to this destination address and protocol. A new IP header will be added to the packet. |
| Tunnel Requirements | Indicates when tunneling is required. If "null" then no check is required. If "in" then incoming session must have been tunneled. If "out" then initiate action to tunnel packet. If "both" then do both. |
| IPSEC Requirements | Indicates when IP Security (IPSEC) processing is required. If "null" then no check is required. If "in" then incoming session must have been protected using IPSEC. If "out" then initiate action to add IPSEC protection. If "both" then do both. |
| Sequence Number Randomize | Option to randomize TCP sequence numbers. Default is "no." |
| Syn Storm Protection | Provide protection from "syn storm" attacks. Default is "no." |
| Authorize Return Channel | If "yes," initial packet will create forward and reverse channels in cache with same action. Default is "yes." |

2. Stateful Packet Filtering

A computer network firewall in accordance with the invention can be configured to utilize "stateful" packet filtering which improves performance by storing in a cache the results of rule processing as applied to one or more packets. Stateful packet filtering may be implemented by caching rule processing results for received packets, and then utilizing the cached results to bypass rule processing for subsequent similar packets. For example, the results of applying a rule set to a packet of a given network session may be cached, such that when a subsequent packet from the same network session arrives in the firewall, the cached results from the previous packet are used for the subsequent packet. This avoids the need to apply the rule set to each incoming packet, and thereby provides substantial performance advantages over conventional firewalls.

As the number of cache entries can grow to many times the number of rules, efficient use of a cache may require indexing (using a hash table, for example). As illustrated by FIG. 4, the cache can include a "session key," hardware address information, interface information, the number of the applicable rule, an alarm code, statistical information, and an applicable action. The session key includes at least one header item which was appended to the data to be transmitted in the packet, and in an exemplary embodiment includes (i) the Internet protocol (IP) source address, (ii) the IP destination address, (iii) the next-level protocol, e.g., transmission control protocol (TCP) or universal datagram protocol (UDP), (iv) the source port associated with the protocol, and (v) the destination port associated with the protocol. In FIG. 4, for the session key, items (i) and (ii) are shown individually. Items (iii) to (v) are represented by "telnet" or "mail" for short.

In the firewall, a decision module or engine, here called a "domain support engine" (DSE) determines which security policy to use for a new network session. Each new session must be approved by the security policies of the source domain and the destination domain(s). For connections going to the Internet, it is likely that only a single domain check is performed. The DSE makes the domain selection based on the incoming or outgoing network interface, as well as on the source or destination network address of each packet. Inclusion, in packets, of source or destination addresses allows for multiple users to be supported by a single network interface. The incoming or outgoing network interface may be in the form of a network interface card (NIC), e.g., an Intel EtherExpress Pro 100B card available from Intel Corporation.

Figure 5A:
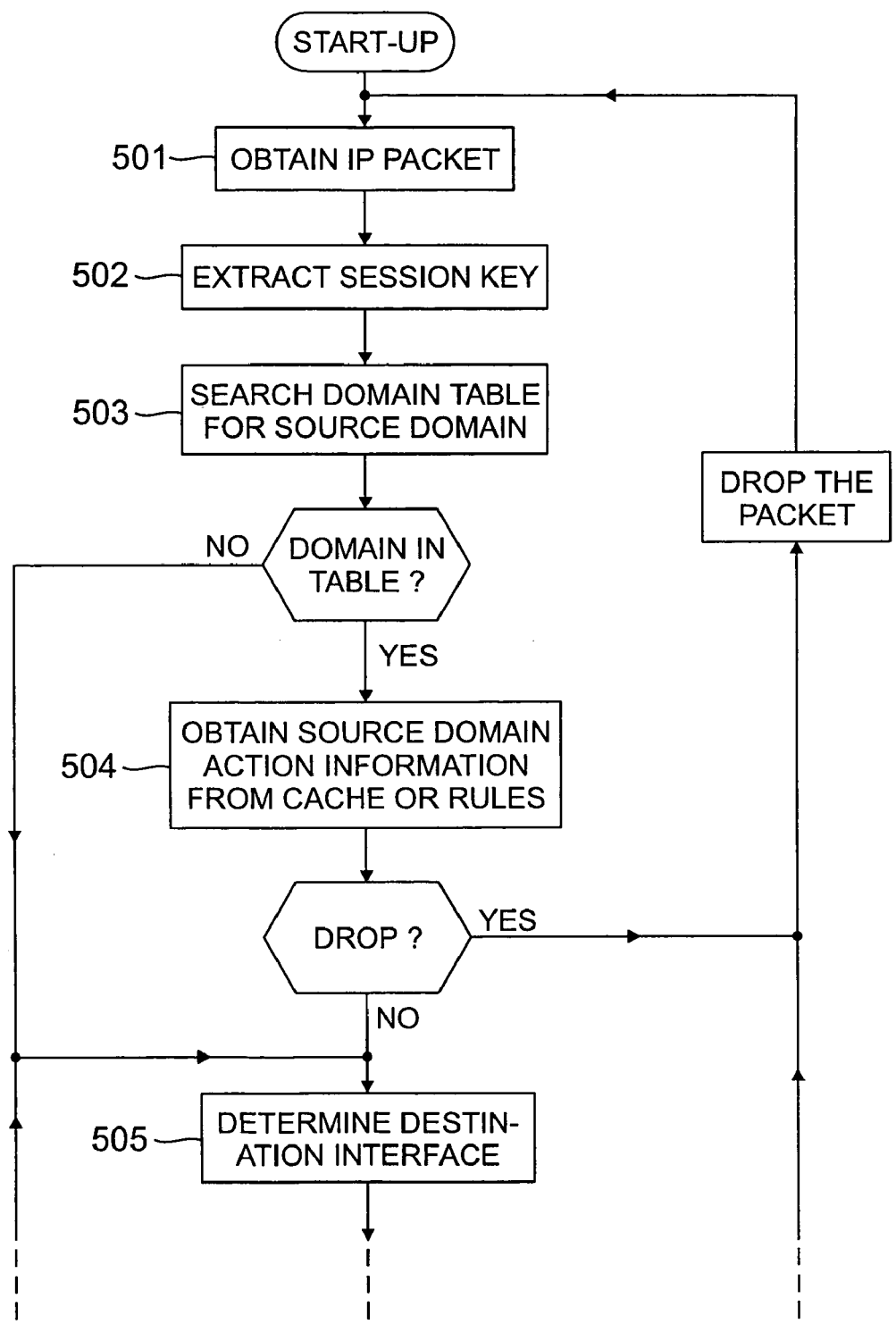
FIGS. 5A and 5B in combination are an over-all flow chart of firewall processing for multiple domains.
Figure 5B:
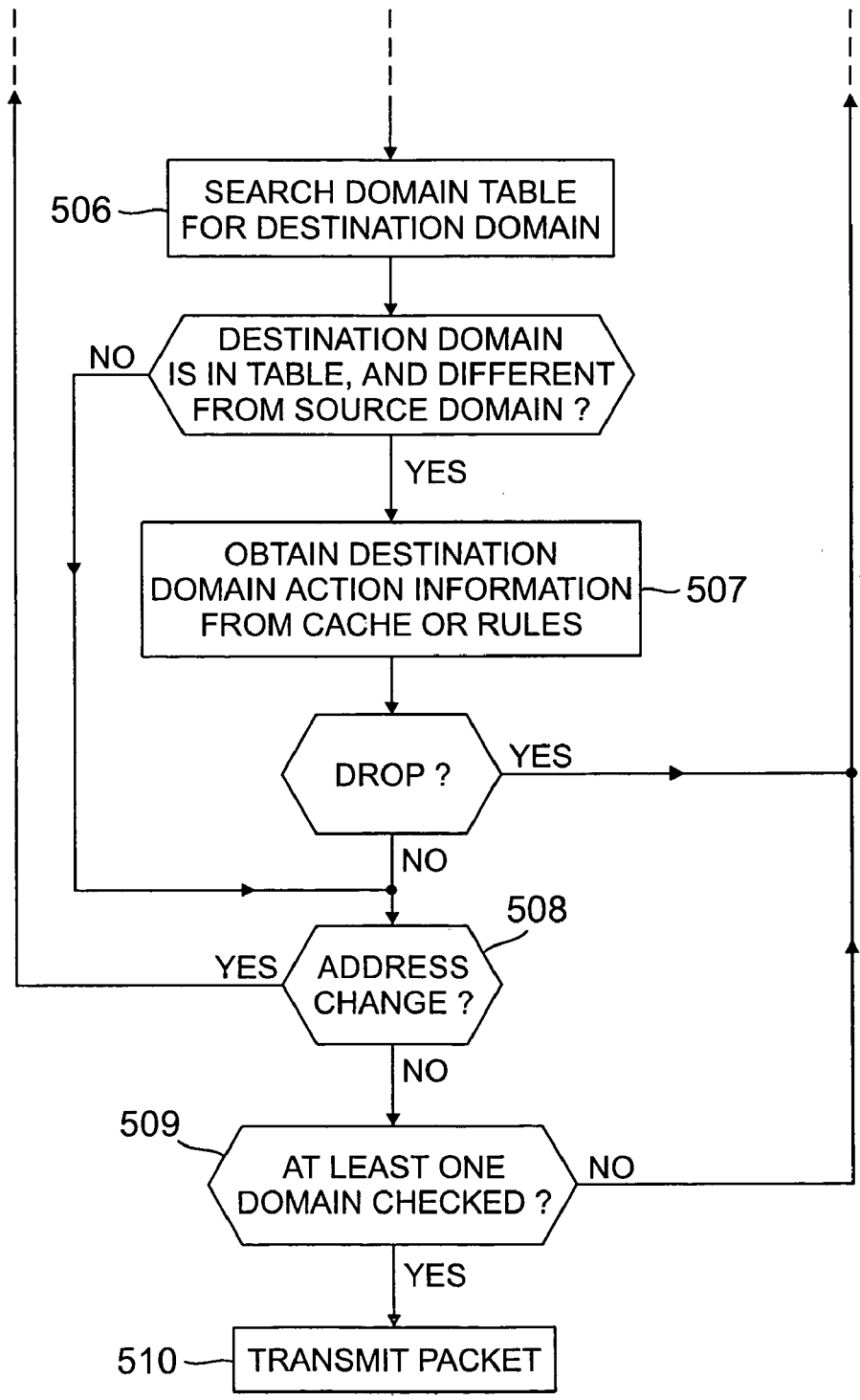

FIGS. 5A and 5B illustrate over-all flow for packet processing by a firewall which supports multiple domains. Such processing includes determining the domains which the packet is to cross, examining the applicable rules to ascertain whether the packet may pass, and determining whether any special processing is required. In the firewall, each domain is associated with one or more network interfaces. Interfaces that support more than one domain are separated using an IP address range to distinguish the packets. The following steps are included:

501: an IP packet is received by the firewall at an interface;

502: the session key is obtained from the IP header of the packet;

503: on the basis of which interface received the packet and the source IP address of the received packet, the source domain is determined as described separately below with reference to FIGS. 6 and 7; if no domain is found, the process skips to step 505;

504: using the session key from step 502, the cache of the source domain is searched for a match; if a match is found in the cache and if the action is not "drop," the process continues with step 505; if a match is found in the cache and the action is "drop," the packet is dropped and the process returns to step 501; if no match is found in the cache, the rule set for the source domain is searched for a match; if a match is found in the rules and if the action is not "drop," the process continues with step 505; if a match is found in the rules and the action is "drop," a corresponding entry is included in the cache, the packet is dropped, and the process returns to step 501; if no match is found in the rules, the packet is dropped and the process returns to step 501;

505: the destination interface is determined using the local area network (LAN) address of the packet, and, if the source domain rule specifies a destination interface, using that destination interface and a routing table;

506: using the destination interface and the destination address of the packet, the destination domain is determined; if the destination domain is not found, or if the destination domain matches the domain just checked, the process skips to step 508;

507: cache look-up and, if required, rule set look-up for the destination domain are carried out in a manner analogous to that employed for the source domain in step 504;

508: if a rule that applies to the packet calls for an address change, e.g., to a proxy or for insertion of one packet into another ("tunnel option"), the process returns to step 505 for processing based on the changed destination;

509: if the packet was not processed with respect to any domain, the packet can be dropped, as a firewall owner has no interest in supporting communications between interfaces which are not subject to any access rules;

510: with all actions having resulted in "pass," the packet is sent out the appropriate network interface.

For convenient linking of each network interface to a domain, a domain table is used. In cases where an interface is shared by multiple domains, an address range is included. This is illustrated by FIG. 6 which shows non-overlapping address ranges.

Figure 7:
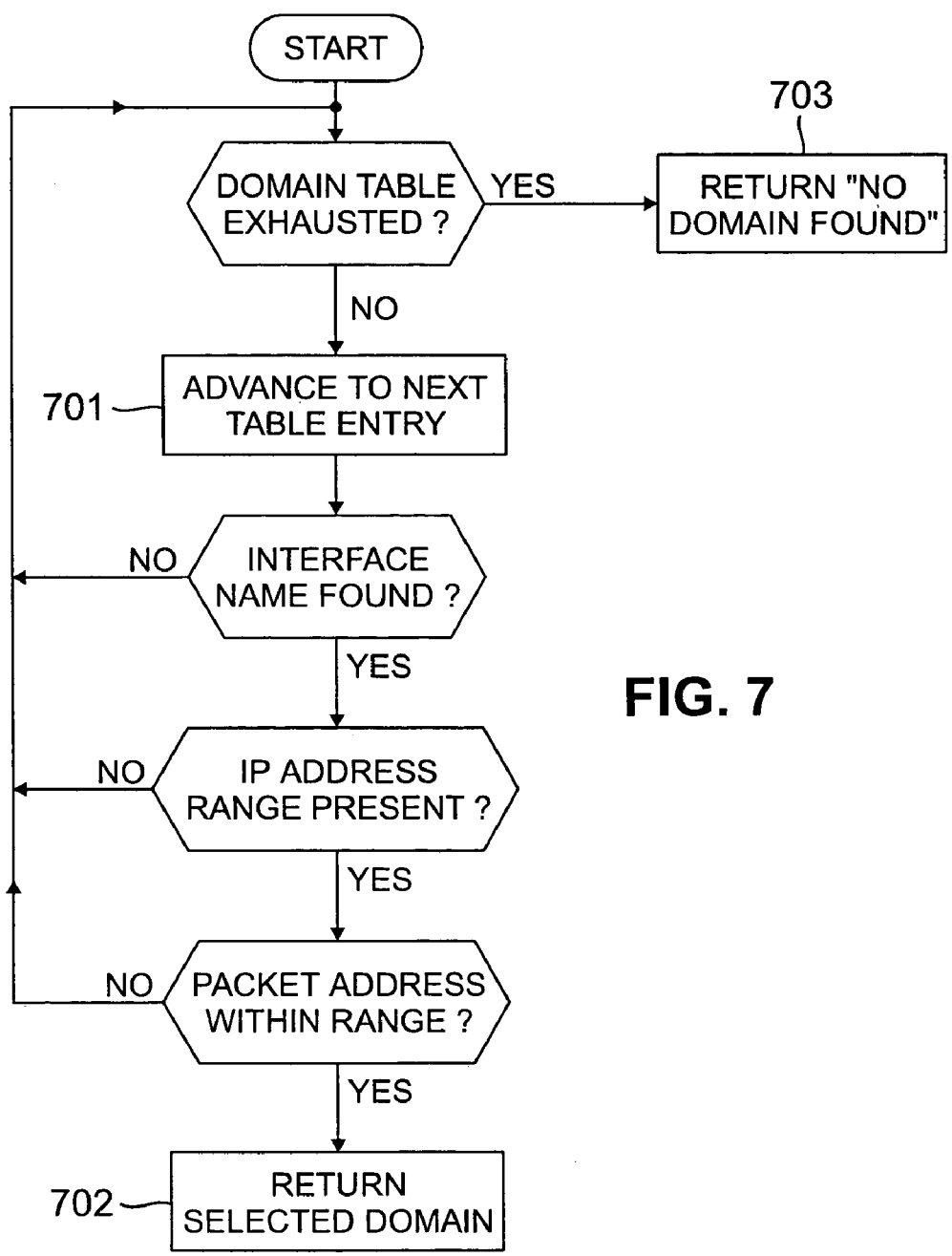
FIG. 7 is a flow chart of an aspect of firewall processing for multiple domains.

FIG. 7 illustrates domain table processing as performed in steps 503 and 506 described above, including the following steps:

701: the domain table is searched for a match of the interface name;

702: if a matching table entry is found, and if the IP address range is present in the matching table entry, the packet address is checked as to whether it is within the range; if so, the specified domain is selected; otherwise, the search continues with the next table entry;

703: if the end of the table is reached without a match having been found, no action is taken.

3. Dependency Mask

For protocols of the type which require a separate, additional network session from the outside back to the user, such as, for example, the protocol employed by RealAudio, a rule can include a condition or mask that allows a connection back to a user, but only if there is a proper forward connection concurrently active, i.e., a connection in which the source and destination addresses are interchanged. As a result, there is no need for a separate or proxy application on the firewall.

A dependency mask in accordance with the invention can define a query directed to the session cache. A match is determined by matching all fields defined in the mask with the corresponding fields in the cache. Empty fields within the mask are not used for comparison.

A dependency mask may be defined in a rule for the first packet of a network session, using (a) information in the packet, (b) the source interface for that packet and (c) one or several dependency conditions that must be met for the packet to pass. When such a first packet has been processed by the firewall, a corresponding entry is made in the cache.

FIG. 8 shows rules with a dependency mask ("hit count") in a format similar to that of FIG. 3. Special symbols are included for certain host designations, namely (i) a "dot" symbol (.) calling for inclusion of packet data of the corresponding category, and (ii) a caret symbol (^) calling for inclusion of packet data from a certain different category instead. "Hit count" indicates the number of matches which must be found in the cache for the specified action to be taken. For example, in the dependency mask named "realaudio," a count of 1 is used for passing UDP packets provided one requisite TCP session is active. In the dependency mask "telnet," a count of 10 is used to drop packets to prevent overloading of resources.

Figure 9:
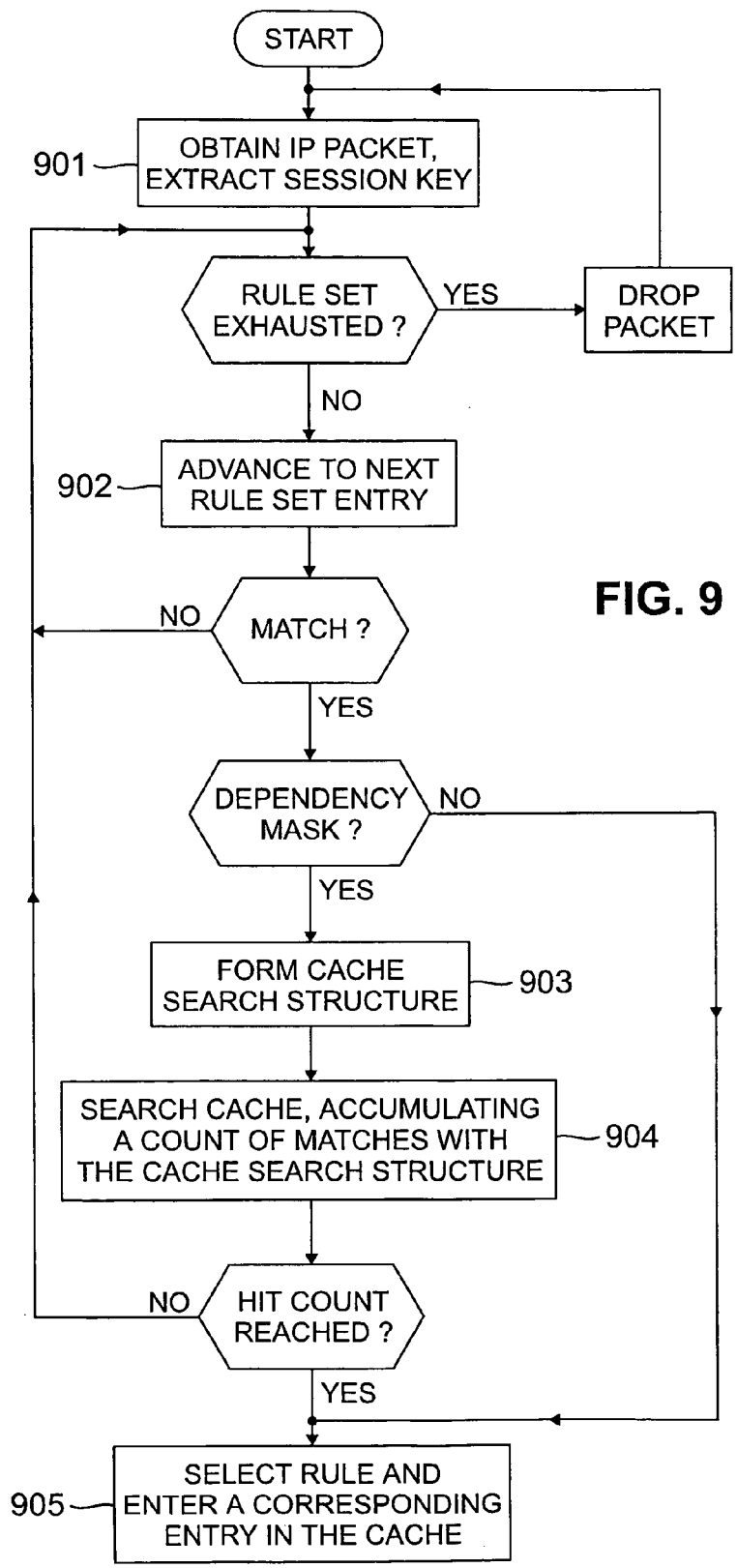
FIG. 9 is a flow chart of dependency mask processing.

FIG. 9 illustrates dependency mask processing including the following steps:

901: the packet is obtained and the session key is extracted;

902: the process steps through the rule set entries; if no match is found with a given rule, the process advances to the next rule in the set; if no match is found by the time the rule set is exhausted, the packet is dropped; if a match is found and the dependency mask field is null, the process skips to step 905;

903: the packet and interface information may be included in the formation of a cache search structure, e.g., a query; if a user authentication flag is set in the dependency mask, the corresponding flag is set in the cache search structure; this defines the query portion of a rule;

904: the cache is searched for a match with the cache search structure and a count of matches is accumulated; this is processing the query portion of the rule;

905: if the accumulated count is equal to or greater than the hit count, the rule is selected and the action associated with the rule is performed; such action may include pass, drop or proxy; also, a corresponding entry is made in the cache; if no match is found in the cache, or if fewer than "hit count" entries were found in the cache, the process returns to step 902 to find another rule; this is processing of the action portion of the rule as a function of the result of the query.

Rule processing, including the above-described dependency mask processing, is performed only on the first packet of a network session. All other packets bypass the rule search functions because their action has been saved in the session cache after processing of the first packet.

4. Dynamic Rules

Dynamic rules are rules which are included with the access rules as a need arises, for processing along with the access rules, e.g., by a rule processing engine. Dynamic rules can include unique, current information such as, for example, specific source and destination port numbers. They can be loaded at any time by trusted parties, e.g., a trusted application, remote proxy or firewall administrator, to authorize specific network sessions. A dynamic rule can be set for single-session use, or its use can be limited as to time. Once a dynamic rule has served its function, it can be removed from the rule set. The dynamic rules allow a given rule set to be modified based on events happening in the network without requiring that the entire rule set be reloaded.

Exemplary dynamic rules include a "one-time" rule which is only used for a single session, a time-limited rule which is used only for a specified time period, and a threshold rule which is used only when certain conditions are satisfied. Another type of dynamic rule includes rules which define a host group, such that the host group can be modified to add or drop different hosts without altering other aspects of the access rule set. Other dynamic rules may be used to facilitate rule setup in certain specific types of processing applications. For example, an FTP proxy application could use a dynamic rule to authorize establishment of an FTP data channel in response to a data request. The dynamic rule in this example would typically not be loaded until a data request is made over the FTP control session, and could be limited to one use and made active for only a limited time period. The rule set therefore need not include a separate data channel rule for use with all requests. As a result, the rule specification and rule processing are simplified, and security is improved.

5. Proxy Reflection

Proxy reflection in accordance with the present invention involves redirecting a network session to another, "remote" proxy server for processing, and then later passing it back via the firewall to the intended destination. When a new session enters the firewall, a decision is made to determine whether service by a proxy server is required. If so, the firewall replaces the destination address in the packet with the host address of the proxy application and, if necessary, it can also change the service port. When the proxy application receives the session, it will request from the firewall the original destination address of the session for determining whether the connection to the destination is authorized. If the proxy then makes the connection to that destination as itself, using its own IP address, the service provided by the firewall will be called "single reflection" or "one-way reflection."

For some users and proxy applications, the connection should appear at the destination to be coming from the original source rather than the remote system. This applies, e.g., to services which check the source IP address to ensure that it matches the user who signed up for the requested service. This capability is provided by "dual reflection" (or "two-way reflection"), with the source address of the outgoing connection changed back from the remote proxy to the original user's source address. This change is effected at the firewall, as each packet is received from the proxy and sent to the destination.

To provide dual reflection capability, the proxy application requests from the firewall the details of the original, incoming network session. The firewall returns a port number to use on the outgoing connection. This port number is unique and will allow the firewall to identify the proper outgoing connection so that it can map the source address to the proper user source address. As a result, the proxy application is invisible to both parties.

In implementing proxy reflection, dynamic rules can be used as described below for an illustrative embodiment, with reference to FIGS. 10A and 10B.

Figure 10A:
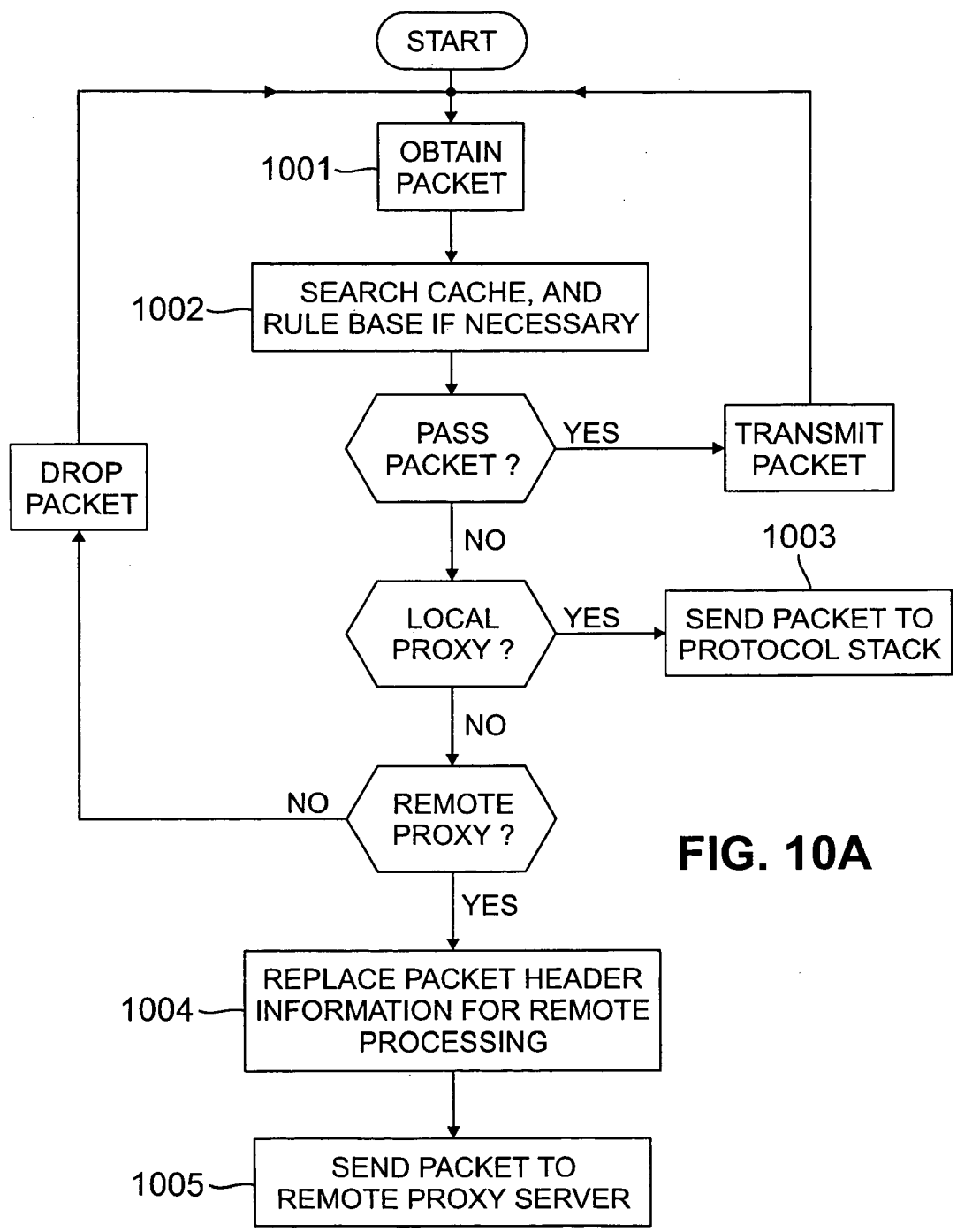
FIG. 10A is a flow chart of proxy reflection processing at the firewall.

FIG. 10A illustrates proxy reflection processing including the following steps at the firewall:

1001: packet is received by the firewall;

1002: action associated with the packet is determined by looking in the appropriate session cache or, if not found in the cache, in the appropriate rule set; if the action is "pass" or "proxy," packet processing continues; if the action is "drop," the packet is dropped;

1003: if the action indicates a proxy application supported locally on the firewall, the packet is sent up the protocol stack to an awaiting proxy application;

1004: if the action indicates a remote proxy, the packet's destination address is replaced with the address of the remote proxy; if configured, the destination port can be changed as well; the original packet header data is recorded in the session cache along with any changed values;

1005: the packet is routed to the remote proxy server.

Figure 10B:
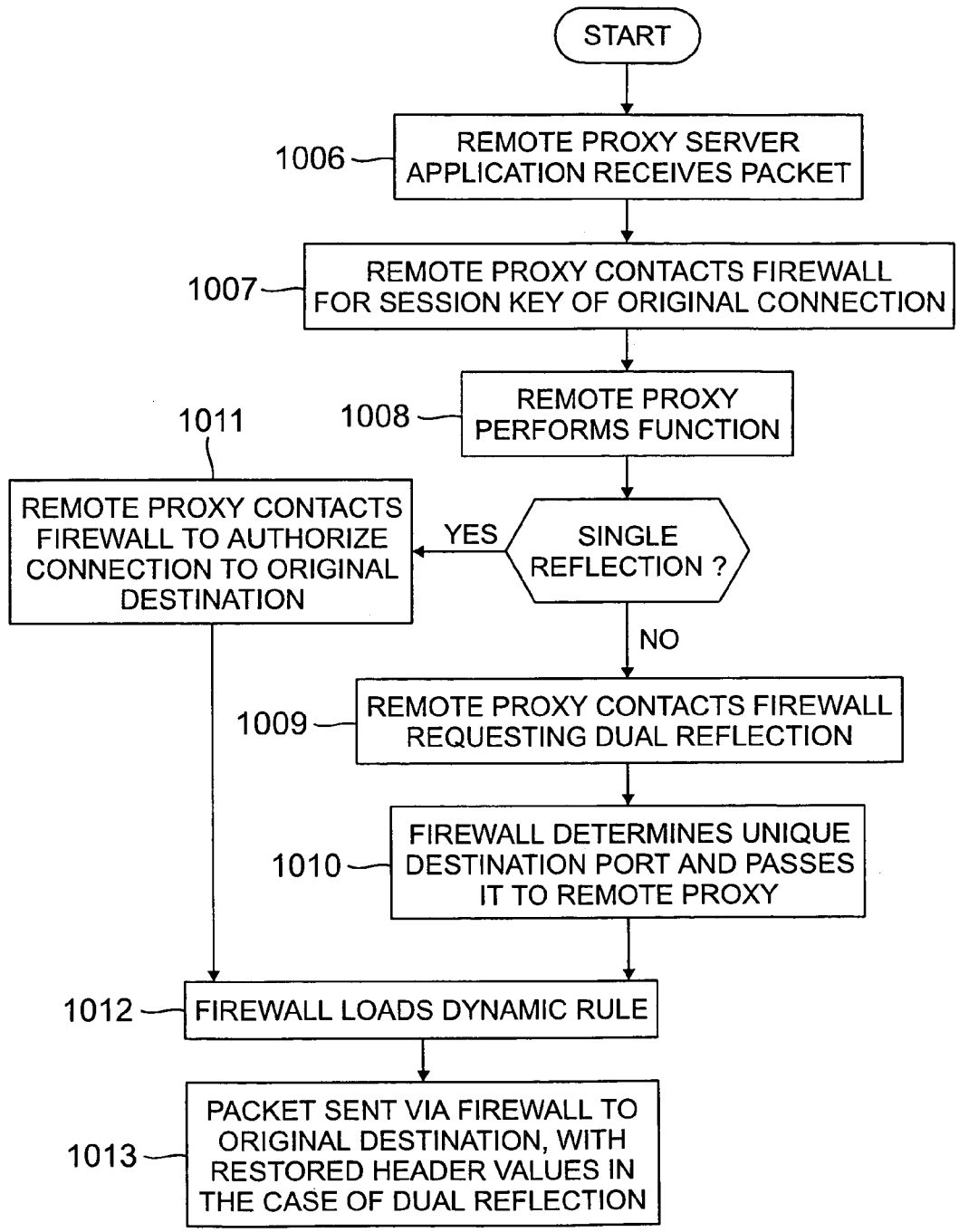
FIG. 10B is a flow chart of proxy reflection processing at a remote proxy.

FIG. 10B illustrates processing at the remote proxy, subsequent to step 1005, including the following steps:

1006: the packet is received in the remote proxy server application;

1007: the remote proxy contacts the firewall for the original session key for the packet;

1008: the remote proxy application uses the original session key to perform its function, such as dropping the connection based on its own security model, performing the requested service, or contacting the original destination address on behalf of the user; if the remote proxy is using single reflection, the process skips to step 1011;

1009: the remote proxy application contacts the firewall over the encrypted channel to request dual reflection capability;

1010: the firewall determines a new destination port number that will guarantee uniqueness of the connection from the server; the firewall passes this new port number and the original session key back to the proxy application;

1011: the remote proxy application requests permission from the firewall for a connection from itself to the original destination;

1012: the firewall loads a dynamic rule to perform this action;

1013: the remote proxy sends the packet to the firewall; based on the dynamic rule loaded in step 1012, the firewall forwards the packet to the original destination; in the case of dual reflection, the proxy uses the destination port which was determined by the firewall in step 1010, and, as the packet passes through the firewall, the IP header values are changed back to the original values.

All future packets associated with the same session are processed alike, except that steps 1007 and 1009–1012 can be skipped. This is because the same dynamic rules apply for the life of the session.

The invention can be implemented in a wide variety of applications. For example, the invention may be used to provide improved firewall performance in a dial-up access gateway. Another exemplary embodiment of the invention may be implemented in a distributed manner with a first portion of the firewall resident in the network and a second portion of the firewall resident in a set-top box, computer or other user terminal in a home or business. The latter embodiment can allow the firewall techniques of the invention to provide, for example, parental control of Internet and video access in the home. These and the other above-described embodiments of the invention are intended to be illustrative only. Numerous alternative embodiments within the scope of the following claims will be apparent to those skilled in the art.

What is claimed is:

1. A method for validating a packet in a computer network, comprising the steps of:
   deriving a session key for said packet;
   selecting at least one of a plurality of security policies as a function of the session key, wherein a security policy comprises multiple rules; and
   using the selected at least one of the security policies in validating said packet.

2. The method of claim 1 wherein the session key includes items derived from header information appended to data in said packet.

3. The method of claim 1 wherein the session key includes at least one item from a set consisting of (i) a source address, (ii) a destination address, (iii) a next-level protocol, (iv) a source port associated with a protocol, and (v) a destination port associated with the protocol.

4. The method of claim 1 wherein the session key includes at least one item from a set consisting of (i) an Internet protocol (IP) source address, (ii) an IP destination address, (iii) a next-level protocol, (iv) the source port associated with the protocol, and (v) the destination port associated with the protocol.

5. The method of claim 3 wherein the next-level protocol is transmission control protocol (TCP) or universal datagram protocol (UDP).

6. The method of claim 1 wherein the network includes a plurality of network interfaces, and wherein the selecting step comprises the step of determining the interface at which the request was received.

7. The method of claim 1 wherein the network includes a plurality of network interfaces, and wherein the selecting step comprises the step of determining the interface to which the request is to be sent.

8. A method for validating a packet in a computer network, comprising the steps of:
designating a plurality of independent security policies, wherein a security policy comprises multiple rules;
determining which security policy is appropriate for the packet; and
validating the packet using at least a portion of the multiple rules of the determined security policy.

9. The method of claim 8 wherein at least a subset of the security policies correspond to different groups associated with a single firewall.

10. The method of claim 8 wherein at least a subset of the security policies correspond to different sub-groups within a given group.

11. The method of claim 8 wherein only an administrator for a given group has access to modify rules of a security policy for that group.

12. An apparatus for use in validating a packet in a firewall of a computer network, the firewall designating a plurality of independent security policies, the apparatus comprising:
a processor associated with the firewall and operative (i) to process the packet to determine which of the security policies is appropriate for the packet, wherein a security policy comprises multiple rules, and (ii) to validate the packet using at least a portion of the multiple rules of the determined security policy.

13. The apparatus of claim 12 wherein at least a subset of the security policies correspond to different groups associated with a single firewall.

14. The apparatus of claim 12 wherein at least a subset of the security policies correspond to different sub-groups within a given group.

15. The apparatus of claim 12 wherein only an administrator for a given group has access to modify rules of a security policy for that group.

16. A method of providing a firewall in a computer network, comprising the steps of:
segmenting a plurality of security policies into a plurality of domains, wherein a domain comprises at least one security policy and a security policy comprises multiple rules, and further wherein a plurality of administrators are associated with the plurality of domains; and
administering the multiple rules such that only an administrator for a given domain is permitted to modify rules of a security policy for that domain.

17. A computer system for packet validation in a computer network, comprising:
means for obtaining at least one data item from a request for a session;
means for selecting at least one of a plurality of security policies as a function of the data item, wherein a security policy comprises multiple rules; and
means for using the selected at least one of the security policies in validating packets of the session.

18. The computer system of claim 17 wherein the network includes a plurality of network interfaces, and wherein the means for selecting comprises means for determining the interface at which the request was received.

19. The computer system of claim 18 wherein the means for determining comprises means for referring to a source IP address contained in the request.

20. The computer system of claim 17 wherein the network includes a plurality of network interfaces, and wherein the means for selecting comprises means for determining the interface to which the request is to be sent.

21. The computer system of claim 20 wherein the means for determining comprises means for referring to a destination IP address contained in the request.

22. A method for packet validation in a computer network, comprising the steps of:
obtaining at least one data item from a request for a session;
selecting at least one of a plurality of security policies as a function of the data item, wherein a security policy comprises multiple rules; and
using the selected at least one of the security policies in validating packets of the session.

23. The method of claim 22 wherein the network includes a plurality of network interfaces, and the selecting step includes determining the interface at which the request was received.

24. The method of claim 23 wherein the determining step includes referring to a source IP address contained in the request.

25. The method of claim 22 wherein the network includes a plurality of network interfaces, and the selecting step includes determining the interface to which the request is to be sent.

26. The method of claim 25 wherein the determining step includes referring to a destination IP address contained in the request.

* * * * *